(12) United States Patent
Galimberti

(10) Patent No.: US 6,534,607 B1
(45) Date of Patent: *Mar. 18, 2003

(54) CATALYSTS AND PROCESSES FOR THE POLYMERIZATION OF OLEFINS

(75) Inventor: Maurizio Galimberti, Milan (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/484,361

(22) Filed: Jan. 14, 2000

Related U.S. Application Data

(63) Continuation of application No. 08/793,863, filed as application No. PCT/EP96/02615 on Jun. 18, 1996, now Pat. No. 6,191,240.

(30) Foreign Application Priority Data

Jun. 20, 1995 (IT) .......................................... MI95A1316

(51) Int. Cl.$^7$ ................................................ C08F 4/642
(52) U.S. Cl. ...................... 526/153; 526/127; 526/160; 502/111; 502/117; 502/132
(58) Field of Search ................................. 502/111, 117, 502/132; 526/127, 153, 160

(56) References Cited

U.S. PATENT DOCUMENTS

| 5,006,500 A | * | 4/1991 | Chang ......................... 502/107 |
| 5,204,419 A | * | 4/1993 | Tsutsui et al. ............... 526/153 |
| 6,191,240 B1 | * | 2/2001 | Galimberti ................... 526/127 |

* cited by examiner

*Primary Examiner*—David W. Wu
*Assistant Examiner*—R. Rabago
(74) *Attorney, Agent, or Firm*—Bryan Cave LLP

(57) ABSTRACT

Catalysts for the polymerization of olefins comprise the product of the reaction between: (A) a titanium, zirconium or hafnium product with substituted cyclopentadiene ligands, (B) a mixture of two organometallic aluminium compounds, with at least one of the groups bound to the aluminium being other than a linear alkyl, and (C) water. When used in the polymerization of olefins, these catalysts show higher activities, at short residence times, than corresponding catalysts obtained from the individual components of the above-mentioned mixtures of aluminium compounds.

21 Claims, 1 Drawing Sheet

CATALYSTS AND PROCESSES FOR THE POLYMERIZATION OF OLEFINS

This is a continuation of U.S. application Ser. No. 08/793,863, filed, May 7, 1997, now U.S. Pat No. 6,191,240, which is a 371 of PCT/EP96/02615, filed Jun. 18, 1996.

The present invention relates to catalysts for the polymerization of olefins, obtained from cyclopentadienyl compounds, organometallic aluminium compounds and water. Homogeneous catalyst systems for the polymerization of olefins are known which comprise a metallocene and the product of the reaction between water and an aluminium alkyl, where the alkyl is other than methyl.

In European Patent Application EP 384 171, catalysts are described which are suitable for the polymerization of olefins and comprise the product of the reaction between:

(A) a metallocene compound of the general formula:

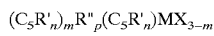

where $(C_5R'_n)$ is a cyclopentadienyl group in which R' is hydrogen, an alkyl, alkenyl, aryl, alkylaryl or arylalkyl radicals having from 1 to 20 C atoms or a group $CR_2SiR_3$ or a group $SiR_3$ with R being defined as for R', or two (or four) substituents R' of one and the same cyclopentadienyl group form one (or two) rings having from 4 to 6 C atoms, R" is a divalent radical selected from an optionally substituted alkylene group having from 1 to 8 C atoms, an $SiR_2$, PR or NR group with R being defined as for R', which forms a bridge link between two cyclopentadienyl groups, X is hydrogen, halogen, —$OMX(C_5R'_n)_2$, —OH or —OR with R being defined as for R', or a hydrocarbon radical having the meaning of R', M is a transition metal of valency 3 or 4, selected from Ti, Zr or Hf, p is 0 or 1, m is 0, 1 or 2, and, if m=0, p=0 and, if p=0, at least one radical R' is other than hydrogen, n=4, if p=1, and n=5, if p=0; and (B) an alumoxane of the formula:

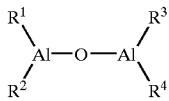

in which $R^1$, $R^2$, $R^3$ and $R^4$ can generically be alkyl, alkenyl or alkylaryl radicals having 2–20 carbon atoms.

The alumoxanes (B) can be prepared by reacting the corresponding trialkylaluminium with water in a 2:1 molar ratio. In the embodiment examples, alumoxanes are used in which $R^1$, $R^2$, $R^3$ and $R^4$ are ethyl, isobutyl or 2-methylpentyl groups.

European Patent Application EP 575 875 describes homogeneous catalyst systems for the polymerization of olefins, obtained by contacting the following components:

(A) a cyclopentadienyl compound of the general formula:

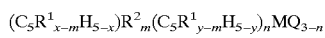

in which M is Ti, Zr or Hf, $C_5R^1_{x-m}H_{5-x}$ and $C_5R^1_{y-m}H_{5-y}$ are cyclopentadiene rings substituted in the same way or different ways, the substituents $R^1$ which can be identical or different are alkyl, alkenyl, aryl, alkylaryl or arylalkyl radicals which have from 1 to 20 carbon atoms and can also contain Si or Ge atoms, or are $Si(CH_3)_3$ groups, or also two or four substituents $R^1$ of one and the same cyclopentadienyl group can form one or two rings having from 4 to 6 carbon atoms, $R^2$ is a group forming a bridge link between the two cyclopentadiene rings and is selected from $CR^3_2$, $C_2R^3_4$, $SiR^3_2$, $Si_2R^3_4$, $GeR^3_2$, $Ge_2R^3_4$, $R^3_2$, $SiCR^3_2$, $NR^1$ or $PR^1$, with the substituents $R^3$ which can be identical or different being $R^1$ or hydrogen, or also two or four substituents $R^3$ can form one or two rings having from 3 to 6 carbon atoms, the substituents Q which can be identical or different are halogen, hydrogen, OH, SH, $R^1$, $OR^1$, $SR^1$, $NR^1_2$ or $PR^1_2$, m can be 0 or 1, n can be 0 or 1, being 1 if m=1, x is an integer between (m+1) and 5, and y is an integer between m and 5;

(B) an organometallic aluminium compound of the general formula $AlR^3_{3-z}H_z$, in which the substituents $R^3$ which can be identical or different are alkyl, alkenyl or alkylaryl radicals which have from 1 to 10 carbon atoms and can also contain Si or Ge atoms, with the proviso that at least one the substituents $R^3$ is other than a linear alkyl group, and z is 0 or 1; and (C) water.

The molar ratio between the organometallic aluminium compound and the water is between 1:1 and 100:1. In the embodiment examples, the organometallic aluminium compounds used are only triisobutylaluminium and triisohexylaluminium.

In Italian Patent Application No. MI/94A/1516, homogeneous catalyst systems for the polymerization of olefins are described which possess an activity improved over those exemplified in the abovementioned patent application EP 575 875, which systems comprise the product obtained by contacting the following components:

(A) a cyclopentadienyl compound of the formula:

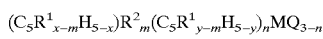

in which M is Ti, Zr or Hf; $C_5R^1_{x-m}H_{5-x}$ and $C_5R^1_{y-m}H_{5-y}$ are cyclopentadiene rings substituted in the same way or different ways, the substituents $R^1$ which can be identical or different are alkyl, alkenyl, aryl, alkylaryl or arylalkyl radicals which have from 1 to 20 carbon atoms and can also contain Si or Ge atoms, or are $Si(CH_3)_3$ groups, or also two or four substituents $R^1$ of one and the same cyclopentadienyl group can form one or two rings having from 4 to 6 carbon atoms, $R^2$ is a group forming a bridge link between the two cyclopentadiene rings and is selected from $CR^3_2$, $C_2R^3_4$, $SiR^3_2$, $Si_2R^3_4$, $GeR^3_2$, $Ge_2R^3_4$, $R^3_2SiCR^3_2$, $NR^1$ or $PR^1$, with the substituents $R^3$ which can be identical or different being $R^1$ or hydrogen, or also two or four substituents $R^3$ can form one or two rings having from 3 to 6 carbon atoms, the substituents Q which can be identical or different are halogen, hydrogen, $R^1$, $OR^1$, $SR^1$, $NR^1_2$ or $PR^1_2$, m can be 0 or 1, n can be 0 or 1, being 1, if m=1, x is an integer between (m+1) and 5 and y is an integer between m and 5;

(B) an organometallic aluminium compound of the formula:

in which $R^4$ is an alkyl, alkenyl or arylalkyl group having from 1 to 10 carbon atoms, $R^5$ is an alkyl, alkenyl or alkylaryl group with a branched chain having from 3 to 10 carbon atoms, or $R^4$ and $R^5$ are fused together to form a ring having from 4 to 6 carbon atoms, $R^6$ is hydrogen or an alkyl, alkenyl or arylalkyl group having from 1 to 10 carbon atoms and z is 0 or 1; and (C) water.

The molar ratio between the organometallic aluminium compound and the water is between 1:1 and 100:1.

The polymerization yields of the catalysts described in the abovementioned patent applications are, albeit relatively high, not altogether satisfactory if the residence times of the reaction mixture in the reactor are short. This is particularly important in industrial polymerization processes, especially in those which operate continuously, where it is very advantageous to operate with short residence times.

It would therefore be desirable to improve the productivity of the abovementioned catalysts at short residence times.

BRIEF DESCRIPTION OF THE INVENTION

A It has now been found, unexpectedly, that catalysts for the polymerization of olefins, of the type of those described in the abovementioned patent applications, obtained from particular mixtures of organometallic aluminium compounds, show superior activities at short residence times than the corresponding catalysts obtained from the individual components of the abovementioned mixtures of aluminium compounds.

BRIEF DESCRIPTION OF THE DRAWING

The drawing shows, for examples 1–5, the relationship of the total grams of feed monomers per gram Zr to the polymerization time in minutes.

DETAILED DESCRIPTION OF THE INVENTION

Figure 1:
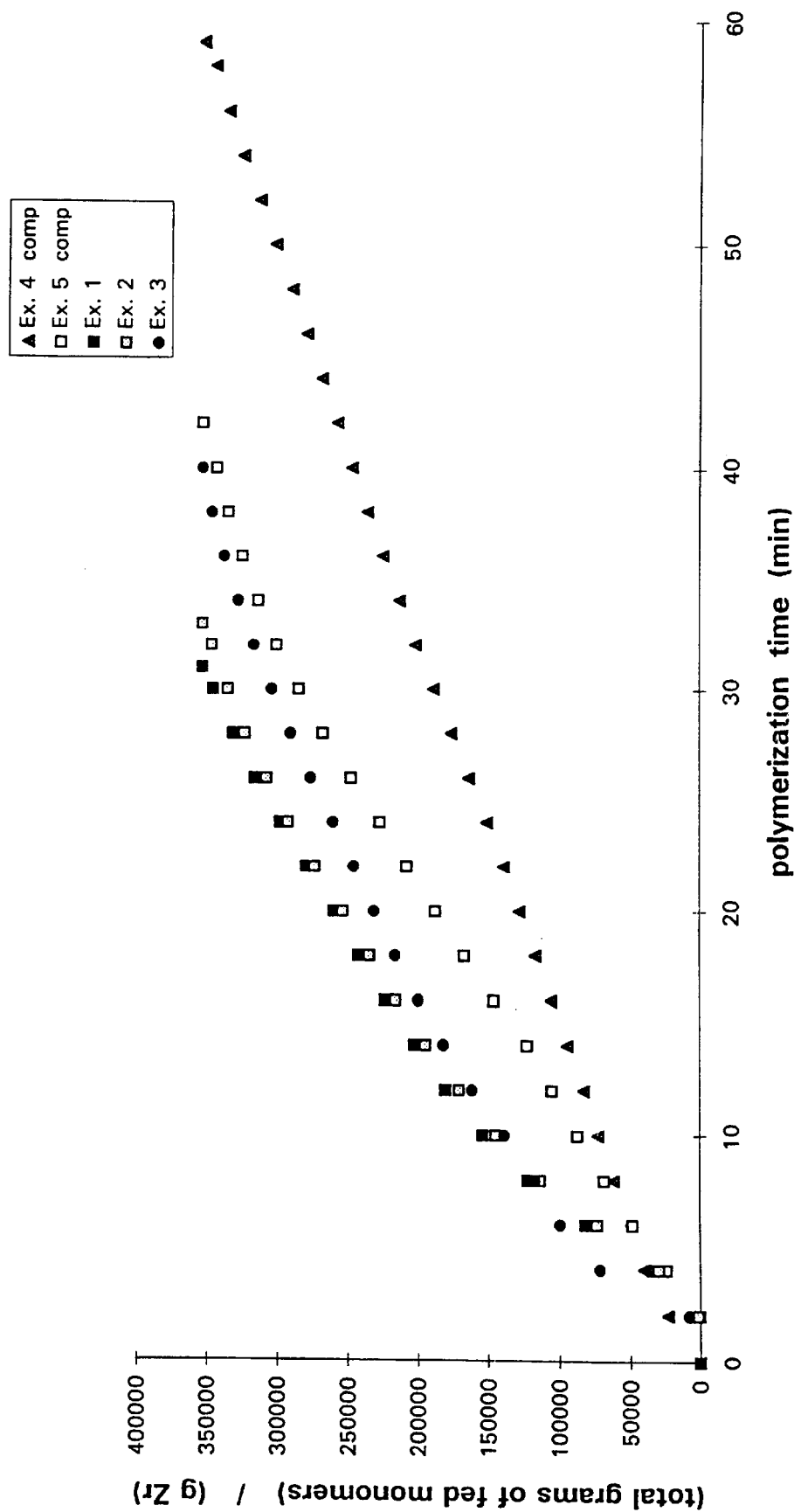

The catalysts which are the subject of the present invention comprise the product obtained by contacting the following components:

(A) a cyclopentadienyl compound of the formula (I):

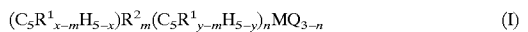  (I)

in which M is Ti, Zr or Hf, $C_5R^1_{x-m}H_{5-x}$ and $C_5R^1_{y-m}H_{5-y}$ are cyclopentadiene rings substituted in the same way or different ways, the substituents $R^1$ which can be identical or different are alkyl, alkenyl, aryl, alkylaryl or arylalkyl radicals which have from 1 to 20 carbon atoms and can also contain Si or Ge atoms, or $Si(CH_3)_3$ groups, or also two or four substituents $R^1$ of one and the same cyclopentadienyl group can form one or two rings having from 4 to 6 carbon atoms, $R^2$ is a group forming a bridge link between the two cyclopentadiene rings and is selected from $CR^3_2$, $C_2R^3_4$, $SiR^3_2$, $Si_2R^3_4$, $GeR^3_2$, $Ge_2R^3_4$, $R^3_2SiCR^3_2$, $NR^1$ or $PR^1$ with the substituents $R^3$ which can be identical or different being $R^1$ or hydrogen, or also two or four substituents $R^3$ can form one or two rings having from 3 to 6 carbon atoms, the substituents Q which can be identical or different are halogen, hydrogen, $R^1$, $OR^1$, $SR^1$, $NR^1_2$ or $PR^1_2$ m can be 0 or 1, n can be 0 or 1, being 1, if m=1, x is an integer between (m+1) and 5, and y is an integer between m and 5;

(B) a mixture composed of:

(B1) 1–99 mol-% of an organometallic aluminium compound of the formula (II):

$Al-(CH_2-CR^4R^5R^6)_{3-z}H_z$  (II)

in which $R^4$ is an alkyl, alkenyl or arylalkyl group having from 1 to 10 carbon atoms, $R^5$ is an alkyl, alkenyl or alkylaryl group with a branched chain having from 3 to 10 carbon atoms, or $R^4$ and $R^5$ are fused together to form a ring having from 4 to 6 carbon atoms, $R^6$ is hydrogen or an alkyl, alkenyl or arylalkyl group having from 1 to 10 carbon atoms, and z is 0 or 1;

(B2) 1–99 mol-% of an organometallic aluminium compound of the formula (III):

$AlR^3_{3-w}H_w$  (III)

in which the substituents $R^3$ which can be identical or different are alkyl, alkenyl or alkylaryl radicals which have from 1 to 10 carbon atoms and can also contain Si or Ge atoms, with the proviso that at least one of the substituents $R^3$ is other than a linear alkyl group, and w is 0 or 1, the compounds of the formula (II) defined above being excluded; and (C) water.

The molar ratio between the total of the organometallic aluminium compounds and the water is between 1:1 and 100:1, preferably between 1:1 and 50:1 and more preferably between 1:1 and 10:1.

The molar ratio between the aluminium and the metal of the cyclopentadienyl compound is between about 50 and 10,000, preferably between about 500 and 5000 and more preferably between 1000 and 2000.

The molar ratio (B1)/(B2) between the two components of the mixture (B) of organometallic aluminium compounds is preferably between about 10:90 and about 90:10, and more preferably is between about 25:75 and about 75:25. Those mixtures (B) are particularly preferred in which the components (B1) and (B2) are present in approximately equimolar quantities.

In the case of m=0, particularly suitable cyclopentadienyl compounds are those in which M is Zr and the groups $C_5R^1_{x-m}H_{5-x}$ and $C_5R^1_{y-m}H_{5-y}$ are pentamethylcyclopentadienyl, indenyl or 4,5,6,7-tetrahydroindenyl, while the substituents Q are chlorine atoms or hydrocarbon groups containing from 1 to 7 carbon atoms.

Non-limiting examples of cyclopentadienyl compounds (A) with m=0 are:

| | | |
|---|---|---|
| $(Me_3Cp)_2MCl_2$ | $(Me_4Cp)_2MCl_2$ | $(Me_5Cp)_2MCl_2$ |
| $(Me_5Cp)_2MMe_2$ | $(Me_5Cp)_2M(OMe)_2$ | $(Me_5Cp)_2M(C_6H_5)_2$ |
| $(Me_5CP)_2M(CH_3)Cl$ | $(EtMe_4Cp)_2MCl_2$ | $[(C_6H_5)Me_4Cp]_2MCl_2$ |
| $(Et_5Cp)_2MCl_2$ | $(Me_5Cp)_2M(C_6H_5)Cl$ | $(Ind)_2MCl_2$ |
| $(Ind)_2MMe_2$ | $(H_4Ind)_2MCl_2$ | $(H_4Ind)_2MMe_2$ |
| $[Si(CH_3)_3Cp]_2MCl_2$ | $\{[Si(CH_3)_3]_2Cp\}_2MCl_2$ | $(Me_4Cp)(Me_5Cp)MCl_2$ |
| $(Me_5Cp)MCl_3$ | $(Me_5Cp)MBenz_3$ | $(Ind)MBenz_3$ |
| $(H_4Ind)MBenz_3$ | | | where Me=methyl, Et=ethyl, Cp=cyclopentadienyl, Ind=indenyl, $H_4Ind$=4,5,6,7-tetrahydroindenyl, Benz=benzyl, M is Ti, Zr or Hf and preferably is Zr.

In the case of m=1, particularly suitable cyclopentadienyl compounds are those in which M is Zr and the groups $C_5R^1_{x-m}H_{5-x}$ and $C_5R^1_{y-m}H_{5-y}$ are tetramethylcyclopentadienyl, indenyl or tetrahydroindenyl and $R^2$ is a group $(CH_3)_2Si$ or $C_2H_4$, while the substituents Q are chlorine atoms or hydrocarbon groups having from 1 to 7 carbon atoms.

Non-limiting examples of cyclopentadienyl compounds (A) with M=1 are:

| | | |
|---|---|---|
| Me$_2$Si(Me$_4$Cp)$_2$MCl$_2$ | Me$_2$Si(Me$_4$Cp)$_2$MMe$_2$ | Me$_2$C(Me$_4$Cp)(MeCp)MCl$_2$ |
| Me$_2$Si(Ind)$_2$MCl$_2$ | Me$_2$CSi(Ind)$_2$MMe$_2$ | Me$_2$Si(Me$_4$Cp)$_2$MCl(OEt) |
| C$_2$H$_4$(Ind)$_2$MCl$_2$ | C$_2$H$_4$(Ind)$_2$MMe$_2$ | C$_2$H$_4$(Ind)$_2$M(NMe$_2$)$_2$ |
| C$_2$H$_4$(H$_4$Ind)$_2$MCl$_2$ | C$_2$H$_4$(H$_4$Ind)$_2$MMe$_2$ | C$_2$H$_4$(H$_4$Ind)$_2$M(NMe$_2$)OMe |
| Ph(Me)Si(Ind)$_2$MCl$_2$ | Ph$_2$Si(Ind)$_2$MCl$_2$ | Me$_2$C(Flu)(Cp)MCl$_2$ |
| C$_2$H$_4$(Me$_4$Cp)$_2$MCl$_2$ | C$_2$Me$_4$(Ind)$_2$MCl$_2$ | Me$_2$SiCH$_2$(Ind)$_2$MCl$_2$ |
| C$_2$H$_4$(2-MeInd)$_2$MCl$_2$ | C$_2$H$_4$(3-MeInd)$_2$MCl$_2$ | C$_2$H$_4$(4,7-Me$_2$Ind)$_2$MCl$_2$ |
| C$_2$H$_4$(5,6-Me$_2$Ind)$_2$MCl$_2$ | | | where Me=methyl, Cp=cyclopentadienyl, Ind=indenyl, Flu=fluorenyl, Ph=phenyl, H$_4$Ind=4,5,6,7-tetrahydroindenyl, M is Ti, Zr or Hf and preferably is Zr.

In the organometallic aluminium compound of the formula (II) which can be used as component (B1), R$^4$ is preferably a methyl or ethyl group, while R$^6$ is preferably a hydrogen atom.

Particularly preferred as components (B1) are the organometallic aluminium compounds in which R$^4$ is a methyl group, R$^5$ is an alkyl group with a branched chain having a number of carbon atoms greater than 4 and R$^6$ is a hydrogen atom.

Non-limiting examples of organometallic aluminium compounds which can be used as components (B1) are: tris-(2,4,4-trimethyl-pentyl)-aluminium and di-(2,4,4-trimethyl-pentyl)-aluminium hydride. The particularly preferred compound is tris-(2,4,4-trimethyl-pentyl)-aluminium (TIOA).

In the organometallic aluminium compound of the formula (II) which can be used as component (B1), preferably all the substituents R$^7$ are non-linear alkyl, alkenyl or alkylaryl radicals. More preferably, all the substituents R$^7$ of the organometallic aluminium compound are isoalkyl radicals.

Non-limiting examples of organometallic aluminium compounds which can be used as components (B2) are:

triethylaluminium,
di-methylisobutylaluminium,
methyl-di-isobutylaluminium,
tri-isobutylaluminium,
di-isobutylaluminium monohydride and
tris-(2,2-dimethylpropyl)aluminium.

The particularly preferred compound is triisobutylaluminium (TIBA).

The components constituting the catalysts of the present invention can be brought into contact in various ways.

In an embodiment example, the mixture of aluminium compounds is contacted with water, and then the reaction product thus obtained is brought into contact with the cyclopentadienyl compound.

A further subject of the present invention is therefore a catalyst for the polymerization of olefins, comprising the product obtained by contacting the following components:
(A) a cyclopentadienyl compound of the formula (I):

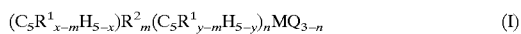

in which M is Ti, Zr or Hf, $C_5R^1_{x-m}H_{5-x}$ and $C_5R^1_{y-m}H_{5-y}$ are cyclopentadiene rings substituted in the same way or different ways, the substituents R$^1$ which can be identical or different are alkyl, alkenyl, aryl, alkylaryl or arylalkyl radicals which have from 1 to 20 carbon atoms and can also contain Si or Ge atoms, or Si(CH$_3$)$_3$ groups, or also two or four substituents R$^1$ of one and the same cyclopentadienyl group can form one or two rings having from 4 to 6 carbon atoms, R$^2$ is a group forming a bridge link between the two cyclopentadiene rings and is selected from CR$^3_2$, C$_2$R$^3_4$, SiR$^3_2$, Si$_2$R$^3_4$, GeR$^3_2$, Ge$_2$R$^3_4$, R$^3_2$SiCR$^3_2$, NR$^1$ or PR$^1$, with the substituents R$^3$ which can be identical or different being R$^1$ or hydrogen, or also two or four substituents R$^3$ can form one or two rings having from 3 to 6 carbon atoms, the substituents Q which can be identical or different are halogen, hydrogen, R$^1$, OR$^1$, SR$^1$, NR$^1_2$ or PR$^1_2$, m can be 0 or 1, n can be 0 or 1, being 1, if m=1, x is an integer between (m+1) and 5, and y is an integer between m and 5; and (B) the product of the reaction between water and a mixture consisting of:
(B1) 10–90 mol-% of an organometallic aluminium compound of the formula (II):

in which R$^4$ is an alkyl, alkenyl or arylalkyl group having from 1 to 10 carbon atoms, R$^5$ is an alkyl, alkenyl or alkylaryl group with a branched chain having from 3 to 10 carbon atoms, or R$^4$ and R$^5$ are fused together to form a ring having from 4 to 6 carbon atoms, R$^6$ is hydrogen or an alkyl, alkenyl or arylalkyl group having from 1 to 10 carbon atoms, and z is 0 or 1; and (B2) 10–90 mol-% of an organometallic aluminium compound of the formula (III):

in which the substituents R$^3$ which can be identical or different are alkyl, alkenyl or alkylaryl radicals which have from 1 to 10 carbon atoms and can also contain Si or Ge atoms, with the proviso that at least one of the substituents R$^3$ is other than a linear alkyl group, and w is 0 or 1, the compounds of the formula (II) defined above being excluded.

The molar ratio between the organometallic aluminium compounds and the water is between 1:1 and 100:1, preferably between 1:1 and 50:1, more preferably between 1:1 and 10:1.

The components of the catalysts of the present invention can be brought into contact by various methods.

For example, it is possible gradually to add water to the mixture of aluminium compounds in solution in an inert aliphatic or aromatic hydrocarbon solvent such as, for example, heptane or toluene. The solution thus obtained is contacted with a solution of a cyclopentadienyl compound in a suitable solvent as, for example, toluene.

According to another way of proceeding, the water can be introduced in the monomer, or in one of the monomers, to be polymerized; in this case, the mixture of aluminium compounds and the cyclopentadienyl compound are first brought into contact before they are used in the polymerization. Moreover, the water can be made to react in a combined form as a hydrated salt, or it can be adsorbed or absorbed on an inert support such as silica. Another preparation method is the reaction of the aluminium compounds with boric anhydride or boric acid.

The catalysts of the present invention can also be used on inert supports. This is effected by depositing the cyclopentadienyl compound, or the product of the reaction thereof with the aluminium compounds pre-reacted with water, or the aluminium compounds pre-reacted with water and then the cyclopentadienyl compound, on inert supports such as, for example, silica, alumina, styrene/ divinylbenzene copolymers, polyethylene or polypropylene.

A particularly suitable class of inert supports which can be used is that constituted by porous organic supports functionalized with groups having active hydrogen atoms. Those are particularly preferred in which the organic support is a partially crosslinked styrene polymer. Supports of this type are described in European Application EP-633 272, the content of which is understood to be incorporated in the present description.

The solid compound thus obtained, in combination with the further addition of aluminium alkyl compounds, whether pre-reacted with water or not, can be used in the gas-phase polymerization.

The catalysts of the present invention can be used in the polymerization reactions of olefins.

A further subject of the present invention is therefore a process for the polymerization of at least one olefin of the formula $CH_2=CHR$, in which R is hydrogen or an alkyl radical having from 1 to 20 carbon atoms, comprising the polymerization reaction of the said olefins in the presence of a catalyst as described above.

The catalysts according to the present invention can advantageously be used in the homopolymerization of ethylene and, in particular, for the preparation of HDPE, and for the copolymerization of ethylene and, in particular, for the preparation of LLDPE.

The LLDPE copolymers which are obtained have a content of it ethylene units of between 80 and 99 mol-%. Their density is between 0.87 and 0.95 g/cm$^3$ and they are characterized by a uniform distribution of the comonomer units within the polymer chain.

The olefins which can be used as comonomers comprise α-olefins of the formula $CH_2=CHR$, where R is a linear or branched or cyclic alkyl radical having from 1 to 20 carbon atoms, or cycloolefins. Examples of such olefins are propylene, 1-butene, 1-pentene, 4-methyl-1-pentene, 1-hexene, 1-octene, allylcyclohexane, cyclopentene, cyclohexene, norbornene and 4,6-dimethyl-1-heptene. The units derived from the olefins of the formula $CH_2=CHR$ or from the cycloolefins are present in the copolymers in quantities from 1 to 20 mol-%.

The copolymers can also contain units derived from polyenes, in particular conjugated or non-conjugated, linear or cyclic dienes such as, for example, 1,4-hexadiene, isoprene, 1,3-butadiene, 1,5-hexadiene and 1,6-heptadiene.

A further use of interest is the preparation of elastomeric copolymers of ethylene with α-olefins of the formula $CH_2=CHR$, where R is an alkyl radical having from 1 to 10 carbon atoms, the said copolymers optimally containing minor proportions of units derived from a polyene.

The saturated elastomeric polymers obtainable by means of the catalysts of the present invention contain from 15 to 85 mol-% of ethylene units, the complement up to 100 consisting of units of one or more α-olefins and/or of one non-conjugated diolefin capable of cyclopolymerizing. The unsaturated elastomeric copolymers contain, besides the units derived from the polymerization of ethylene and α-olefins, also minor proportions of unsaturated units derived from the copolymerization of one or more polyenes. The content of unsaturated units can vary from 0.1 to 5% by weight and is preferably between 0.2 and 2% by weight.

The copolymers obtainable are characterized by valuable properties, such as a low ash content and a uniform distribution of the comonomers in the copolymer chain.

The α-olefins which can be used comprise, for example, propylene, 1-butene and 4-methyl-1-pentene. The preferred α-olefin is propylene.

The non-conjugated diolefins capable of cyclopolymerizing, which can be used, are 1,5-hexadiene, 1,6-heptadiene and 2-methyl-1,5-hexadiene.

The polyenes capable of giving unsaturated units, which can be used, are:
conjugated dienes such as, for example, butadiene and isoprene;
non-conjugated linear dienes such as, for example, trans-1,4-hexadiene, cis-1,4-hexadiene, 6-methyl-1,5-heptadiene, 3,7-dimethyl-1,6-octadiene and 11-methyl-1,10-dodecadiene;
monocyclic diolefins such as, for example, cis-1,5-cyclooctadiene and 5-methyl-1,5-cyclooctadiene;
bicyclic diolefins such as, for example, 4,5,8,9-tetrahydroindene and 6- and/or 7-methyl-4,5,8,9-tetrahydroindene;
alkenyl- or alkylidene-norbornenes such as, for example, 5-ethylidene-2-norbornene, 5-isopropylidene-2-norbornene, exo-5-isopropenyl-2-norbornene and 5-vinyl-2-norbornene;
polycyclic diolefins such as, for example, dicyclopentadiene, tricyclo[6.2.1.0$^{2,7}$]4,9-undecadiene and its 4-methyl derivative.

Preferred polyenes are 5-ethylidene-2-norbornene, trans-1,4-hexadiene and cis-1,4-hexadiene. 5-Ethylidene-2-norbornene (ENB) is particularly preferred.

The polymerization processes, which use the catalysts of the invention, can be carried out in the liquid phase, in the presence or absence of an inert hydrocarbon solvent, or in the gas phase. The hydrocarbon solvent can be aromatic such as toluene, or aliphatic such as propane, hexane, heptane, isobutane and cyclohexane.

The polymerization temperature is generally between −100° C. and 250° C. In particular, in the processes for the preparation of HDPE or LLDPE, it is generally between 20° C. and 150° C. and especially between 40° C. and 90° C. In the processes for the preparation of elastomeric copolymers, it is generally between 20° C. and 100° C. and especially between 30° C. and 80° C.

The molecular weight of the polymers can be varied simply by altering the polymerization temperature, the type or the concentration of the catalyst components or using molecular weight regulators such as, for example, hydrogen.

The molecular weight distribution can be varied by using mixtures of different cyclopentadienyl compounds or by carrying out the polymerization in several stages which differ in the polymerization temperatures and/or in the concentrations of the molecular weight regulator.

The catalyst components can be brought into mutual contact before the polymerization. The contact time is generally between 1 and 60 minutes, preferably between 5 and 20 minutes. The pre-contact concentrations for the cyclopentadienyl compound are between $10^{-2}$ and $10^{-8}$ mol/l, while, for the product of the reaction between aluminium alkyl and water, they are between 10 and $10^{-3}$ mol/l. The precontact is in general effected in the presence of a hydrocarbon solvent and, if appropriate, small quantities of monomer.

FIG. 1 shows a graph of the productivity, to give ethylene/propylene copolymers, of catalysts according to the invention and according to the known technology as a function of the polymerization time. This graph clearly shows the higher productivity of the catalysts according to the invention as compared with known catalysts at short polymerization times.

The following examples are given for illustrative purposes and do not limit the invention.

Characterizations

The intrinsic viscosity [η] was measured in tetralin at 135° C.

The comonomer content in the elastomeric ethylene/propylene copolymers was determined by IR.

The catalyst components were prepared as follows:

Cyclopentadienyl Compounds rac-Ethylene-Bis(4,5,6,7-Tetrahydroindenyl) Zirconium Dichloride (r-EBTHIZrCl$_2$)

This was prepared according to the procedure described in EP 575,875.

Organometallic Aluminium Compounds

Tri-Isobutylaluminium [TIBA]

The commercial product from WITCO was used.

Tris-(2,4,4-Trimethyl-Pentyl)-Aluminium [TIOA]

This was prepared according to the method described in Liebigs Ann. Chem. vol. 629, Ziegler et al. "Aluminumtrialkyle und Dialkyl-aluminumhydride aus Aluminumisobutyl-Verbindungen [Aluminium trialkyls and dialkyl-aluminium hydrides from aluminium isobutyl compounds]", pages 14–19.0.

EXAMPLES 1–3

Preparation of Elastomeric C$_2$/C$_3$-copolymers 1324 g (2 liters) of n-hexane, 44.7 g of ethylene, 388 g of propylene and 0.94 mmol of water were introduced at ambient temperature into a 4.25 liter autoclave fitted with stirrer, mano-meter, temperature indicator, catalyst-charging system, monomer feed lines and thermostat jacket, and purified by purging with ethylene at 80° C.

The catalyst solution was prepared by adding the quantities of aluminium alkyls given in Table 1 to a suspension of 0.8 mg of r-EBTHI$_2$ZrCl$_2$ in a hydrocarbon solvent consisting of about 2 ml of solvent per mg of metallocene. Stirring of the mixture was continued for 5 minutes at a temperature of 20° C., and the solution was then injected into the autoclave under ethylene pressure at a temperature about 2° C. lower than the polymerization temperature. The temperature was then raised within about 2 minutes to 50° C. and kept constant for the whole duration of the polymerization.

The pressure was kept constant at a value of 9.6 bar by feeding an ethylene/propylene mixture in a 60:40 ratio. The consumption of monomers fed was monitored at regular time intervals (2 minutes) throughout the whole duration of the polymerization. When the total quantity of monomers fed reached a value of 60 g, the reaction was stopped by degassing the monomers. The polymer obtained was dried in an oven at 60° C. in vacuo.

The data relating to the polymerization and to the characterization of the copolymer obtained are given in Table 1.

The data relating to the consumption of monomers as a function of the polymerization time are given in Table 2.

EXAMPLES 4–5

(Comparison)

Preparation of Elastomeric C$_2$/C$_3$-copolymers

The procedure described in Examples 1–3 was followed, but with the difference that only one of the components of the mixture (B) of aluminium compounds was used.

The data relating to the polymerization and to the characterization of the polymer obtained are given in Table 1. The data relating to the monomer consumption as a function of the polymerization time are given in Table 2.

TABLE 1

| EXAMPLE | TIBA (mmol) | TIOA (mmol) | Al/H$_2$O (mol) | time (min) | C$_2$ units (% by weight) | [η] (dl/g) |
|---|---|---|---|---|---|---|
| 1 | 0.94 | 0.94 | 2 | 31 | 57.3 | 3.75 |
| 2 | 0.47 | 1.41 | 2 | 33 | 55.6 | 3.70 |
| 3 | 1.41 | 0.47 | 2 | 39 | 62.3 | 4.20 |
| 4 (comp.) | 1.88 | 0 | 2 | 59 | 63.1 | 4.56 |
| 5 (comp.) | 0 | 1.88 | 2 | 42 | 56.9 | 3.93 |

TABLE 2

| polymerization time (min) | total monomers fed (g) | | | | |
|---|---|---|---|---|---|
| | EX. 1 | EX. 2 | Ex. 3 | EX. 4 (comp) | EX. 5 (comp) |
| 2 | 0 | 0.2 | 1.3 | 3.9 | 0.1 |
| 4 | 5.8 | 5 | 12.1 | 6.8 | 4.1 |
| 6 | 13.9 | 12.4 | 17 | 8.3 | 8.2 |
| 8 | 20.8 | 19.4 | 20 | 10.5 | 11.6 |
| 10 | 26.2 | 24.6 | 23.6 | 12.3 | 14.8 |
| 12 | 30.7 | 29.1 | 27.5 | 14.1 | 17.9 |
| 14 | 34.5 | 33.1 | 31 | 16 | 20.9 |
| 16 | 38 | 36.7 | 34 | 18 | 24.8 |
| 18 | 41.2 | 39.9 | 36.8 | 19.9 | 28.4 |
| 20 | 44.2 | 43.1 | 39.3 | 21.8 | 31.9 |
| 22 | 47.5 | 46.5 | 41.8 | 23.6 | 35.4 |
| 24 | 50.7 | 49.7 | 44.3 | 25.6 | 38.6 |
| 26 | 53.7 | 52.3 | 47 | 27.8 | 42.1 |
| 28 | 56.3 | 54.9 | 49.4 | 30 | 45.5 |
| 30 | 58.7 | 56.9 | 51.7 | 32.1 | 48.4 |
| 32 | 60* | 58.9 | 53.8 | 34.3 | 51.1 |
| 34 | | 60• | 55.7 | 36.3 | 53.3 |
| 36 | | | 57.4 | 38.3 | 55.2 |
| 38 | | | 58.9 | 40.1 | 56.9 |
| 40 | | | 60 | 42 | 58.3 |
| 42 | | | | 43.8 | 60 |
| 44 | | | | 45.7 | |
| 46 | | | | 47.5 | |
| 48 | | | | 49.3 | |
| 50 | | | | 51.3 | |
| 52 | | | | 53.2 | |
| 54 | | | | 55.2 | |
| 56 | | | | 57 | |
| 58 | | | | 58.6 | |
| 59 | | | | 60 | |

*31 minutes
•33 minutes

What is claimed is:

1. Catalyst for the polymerization of olefins, comprising the product of the reaction between the following components:

(A) a cyclopentadienyl compound of the formula (I):

$$(C_5R^1{}_{x-m}H_{5-x})R^2{}_m(C_5R^1{}_{y-m}H_{5-y})_nMQ_{3-n} \qquad (I)$$

in which
M is Ti, Zr or Hf,
$C_5R^1{}_{x-m}H_{5-x}$ and $C_5R^1{}_{y-m}H_{5-y}$ are cyclopentadiene rings substituted in the same way or different ways,
the substituents $R^1$, which are identical or different, are alkyl, alkenyl, aryl, alkylaryl or arylalkyl radicals which have from 1 to 20 carbon atoms and can also contain one or more Si atoms, or $Si(CH_3)_3$ groups, or also two or four substituents $R^1$ of the same cyclopentadienyl group can form one or two rings having from 4 to 6 carbon atoms,
$R^2$ is a group forming a bridge link between the two cyclopentadiene rings and is selected from the group consisting of $CR^3{}_2$, $C_2R^3{}_4$, $SiR^3{}_2$, $Si_2R^3{}_4$, $GeR^3{}_2$, $Ge_2R^3{}_4$, $R^3{}_2SiCR^3{}_2$, $NR^1$, and $PR^1$;
substituents $R^3$, which are identical or different, being R or hydrogen, and two or four substituents $R^3$ can form one or two rings having from 3 to 6 carbon atoms, the radicals Q, which are identical or different, are halogen, hydrogen, $R^1$ or $OR^1$, $SR^1$, $NR^1{}_2$ or $PR^1{}_2$,
m is 0 or 1,
n is 0 or 1, being 1, if m=1,
x is an integer between (m+1) and 5, and
y is an integer between m and 5;
(B) a mixture composed of:
(B1) 1–99 mol-% of an organoaluminium compound of the formula (II):

$$Al\text{—}(CH_2\text{—}CR^4R^5R^6)_{3-z}H_z \qquad (II)$$

in which
$R^4$ is an alkyl, alkenyl or arylalkyl group having from 1 to 10 carbon atoms,
$R^5$ is an alkyl, alkenyl or alkylaryl group with a branched chain having from 3 to 10 carbon atoms, or $R^4$ and $R^5$ are fused together to form a ring having from 4 to 6 carbon atoms,
$R^6$ is hydrogen or an alkyl, alkenyl or arylalkyl group having from 1 to 10 carbon atoms, and
z is 0 or 1;
(B2) 1–99 mol-% of an organoaluminium compound of the formula (III):

$$AlR^3{}_{3-w}H_w \qquad (III)$$

in which the radicals $R^3$, which are identical or different, are alkyl, alkenyl or alkylaryl radicals which have from 1 to 10 carbon atoms and can also contain Si or Ge atoms, with the proviso that at least one of the substituents $R^3$ is other than a linear alkyl group, and w is 0 or 1, the compounds of the formula (II) defined above being excluded; and
(C) water,
the molar ratio between the organometallic aluminium compounds and the water being between 1:1 and 100:1.

2. Catalyst according to claim 1, wherein the molar ratio between the organoaluminium compound and the water is between 1:1 and 10:1.

3. Catalyst according to claim 1, wherein the molar ratio between the aluminium of the organoaluminium compounds and the metal M of the cyclopentadienyl compound is between 50 and 10,000.

4. Catalyst according to claim 1, wherein in the cyclopentadienyl compound (A), m=0, the groups $C_5R^1{}_{x-m}H_{5-x}$ and $C_5R^1{}_{y-m}H_{5-y}$ are pentamethylcyclopentadienyl, indenyl or 4,5,6,7-tetrahydroindenyl, M is Zr and the radicals Q are chlorine atoms or hydrocarbon groups containing from 1 to 7 carbon atoms.

5. Catalyst according to claim 1, wherein in the cyclopentadienyl compound (A), m=1, n=1, $R^2$ is a divalent group $(CH_3)_2Si$ or $C_2H_4$ and the groups $C_5R^1{}_{x-m}H_{5-x}$ and $C_5R^1{}_{y-m}H_{5-y}$ are selected from the group consisting of tetramethyl-cyclopentadienyl, indenyl 4,5,6,7-tetrahydroindenyl, 2-methyl-4,5,6,7-tetrahydroindenyl, 4,7-dimethyl-4,5,6,7-tetrahydroindenyl, 2,4,7-trimethyl-4,5,6,7-tetrahydroindenyl and fluorenyl.

6. Catalyst according to claim 1, wherein in the cyclopentadienyl compound of the formula (I) the radicals Q are chlorine atoms or methyl groups.

7. Catalyst according to claim 1, wherein in the organoaluminium compounds of the formula (II) $R^4$ is a methyl or ethyl group.

8. Catalyst according to claim 1 wherein in the organoaluminium compounds of the formula (II) $R^6$ is hydrogen.

9. Catalyst according to claim 8, wherein in the organoaluminium compounds of the formula (II) $R^4$ is a methyl group and $R^5$ is an alkyl group with a branched chain having a number of carbon atoms greater than 4.

10. Catalyst according to claim 1, wherein the organoaluminium compounds of the formula (II) is tri-(2,4,4-trimethyl-pentyl)-aluminium.

11. Catalyst for the polymerization of olefins, comprising the product of the reaction between the following components:
(A) a cyclopentadienyl compound of the formula (I)

$$(C_5R^1{}_{x-m}H_{5-x})R^2{}_m(C_5R^1{}_{y-m}H_{5-y})_nMQ_{3-n} \qquad (I)$$

in which
M is Ti, Zr or Hf,
$C_5R^1{}_{x-m}H_{5-x}$ and $C_5R^1{}_{y-m}H_{5-y}$ are cyclopentadiene rings substituted in the same way or different ways,
the substituents $R^1$, which are identical or different are alkyl, alkenyl, aryl, alkylaryl or arylalkyl radicals which have from 1 to 20 carbon atoms and also contain one or more Si atoms, or $Si(CH_3)_3$ groups, or also two or four substituents $R^1$ of the same cyclopentadienyl group can form one or two rings having from 4 to 6 carbon atoms.
$R^2$ is a group forming a bridge link between the two cyclopentadiene rings and is selected from the group consisting of $CR^3{}_2$, $C_2R^3{}_4$, $SiR^3{}_2$, $Si_2R^3{}_4$, $GeR^3{}_2$, $Ge_2R^3{}_4$, $R^3{}_2SiCR^3{}_2$, $NR^1$, and $PR^1$,
substituents $R^3$, which are identical or different, being $R^1$ or hydrogen, or also two or four substituents $R^3$ can form one or two rings having from 3 to 6 carbon atoms,
the radicals Q, which are identical or different, are halogen, hydrogen, $R^1$ or $OR^1$, $SR^1$,
$NR^1{}_2$ or $PR^1{}_2$,
m is 0 or 1,
n is 0 or 1, being 1, if m=1,
x is an integer between (m+1) and 5, and
y is an integer between m and 5; and
(B) the product of the reaction between water and a mixture composed of:
(B1) 10–90 mol-% of an organoaluminium compound of the formula (II):

$$Al\text{—}(CH_2\text{—}CR^4R^5R^6)_{3-z}H_z \qquad (II)$$

in which
R⁴ is an alkyl, alkenyl or arylalkyl group having from 1 to 10 carbon atoms,
R⁵ is an alkyl, alkenyl or alkylaryl group with a branched chain having from 3 to 10 carbon atoms, or R⁴ and R⁵ are fused together to form a cycle having from 4 to 6 carbon atoms,
R⁶ is hydrogen or an alkyl, alkenyl or arylalkyl group having from 1 to 10 carbon atoms, and
z is 0 or 1; and
(B2) 10–90 mol-% of an organoaluminium compound of the formula (III):

$$AlR^3{}_{3-w}H_w \qquad (III)$$

in which the radicals R³, which are identical or different, are alkyl, alkenyl or alkylaryl radicals which have from 1 to 10 carbon atoms and can also contain Si or Ge atoms, with the proviso that at least one of the substituents R³ is other than a linear alkyl group, and
w is 0 or 1, the compounds of the formula (II) defined above being excluded;
the molar ratio between the organometallic aluminium compounds and the water being between 1:1 and 100:1.

12. Process for the polymerization of at least one olefin of the formula CH₂=CHR, in which R is hydrogen or an alkyl, cycloalkyl or aryl radical having from 1 to 20 carbon atoms, comprising the polymerization reaction of said olefins in the presence of a catalyst according to claim 1.

13. Process for the preparation of ethylene homopolymers, comprising the polymerization reaction of ethylene in the presence of a catalyst according to claim 11.

14. Process for the preparation of ethylene copolymers with one or more α-olefins of the formula CH₂=CHR, where R is a linear, branched or cyclic alkyl radical having from 1 to 20 carbon atoms or a cycloolefin, the said copolymers containing from 80 to 99 mol-% of ethylene units and from 1 to 20 mol-% of alpha-olefin or cycloolefin units and optionally minor proportions of polyene units, comprising the polymerization reaction of the ethylene as a mixture with the α-olefin(s) or cycloolefin(s) and optionally with the polyene in the presence of a catalyst according to claim 1.

15. Process for the preparation of elastomeric ethylene copolymers with one or more alpha-olefins of the formula CH₂=CHR, where R is an alkyl radical having from 1 to 10 carbon atoms, the said copolymers optionally containing minor proportions of polyene units, comprising the polymerization reaction of the ethylene as a mixture with one or more alpha-olefins and optionally with minor proportions of a polyene in the presence of a catalyst according to claim 1.

16. Process according to claim 15, wherein the copolymers contain from 15 to 85 mol-% of ethylene and from 85 to 15 mol-% of an alpha-olefin selected from the group from propylene, 1-butene and 4-methyl-1-pentene.

17. Process according to claim 15, wherein the copolymers contain from 15 to 85 mol-% of ethylene and from 85 to 15 mol-% of an alpha-olefin selected from the group consisting of propylene, 1-butane and 4-1-pentene.

18. The catalyst for the polymerization of olefins according to claim 11 in which said cyclopentadienyl compound of said formula (I) is rac-ethylene-bis(4,5,6,7-tetrahydroindenyl) Zirconium dichloride, said organoaluminium compound of formula (II) is tri-isobutylaluminium and said organoaluminium compound of formula (III) is tris-(2,4,4-trimethyl-pentyl)-aluminium.

19. The process according to claim 18, wherein the copolymers contain from 15 to 85 mol-% of ethylene and form 85 to 15 mol-% of an alpha-olefin selected from the group consisting of propylene, 1-butene and 4-methyl-1-pentene.

20. The catalyst for the polymerization of olefins according to claim 1 in which the combination of said organoaluminium compound of formula (II) and said organoaluminium compound of formula (III) produces superior activity at shorter residence times than a catalyst using only one of said organoaluminium compound of formula (II) and said organoaluminium compound of formula (III).

21. The catalyst for the polymerization of olefins according to claim 11 in which the combination of said organoaluminium compound of formula (II) and said organoaluminium compound of formula (III) produces superior activity at shorter residence times than a catalyst using only one of said organoaluminium compound of formula (II) and said organoaluminium compound of formula (III).

* * * * *